(12) United States Patent
Oh et al.

(10) Patent No.: US 12,157,195 B2
(45) Date of Patent: Dec. 3, 2024

(54) APPARATUS FOR DETECTING STATUS OF TOOL IN MACHINE TOOL

(71) Applicant: HYUNDAI WIA CORPORATION, Changwon-si (KR)

(72) Inventors: Young Kyo Oh, Uiwang-si (KR); Won Ju Kim, Uiwang-si (KR); Yeo Chan Yoon, Uiwang-si (KR)

(73) Assignee: Hyundai Wia Corporation, Changwon-si (KR)

( * ) Notice: Subject to any disclaimer, the term of this patent is extended or adjusted under 35 U.S.C. 154(b) by 685 days.

(21) Appl. No.: 17/303,619

(22) Filed: Jun. 3, 2021

(65) Prior Publication Data

US 2022/0163944 A1 May 26, 2022

(30) Foreign Application Priority Data

Nov. 24, 2020 (KR) ................. 10-2020-0158796

(51) Int. Cl.
*B23Q 17/09* (2006.01)
*G01N 19/08* (2006.01)

(52) U.S. Cl.
CPC ..... *B23Q 17/0971* (2013.01); *B23Q 17/0952* (2013.01); *G01N 19/08* (2013.01); *G05B 2219/35354* (2013.01); *G05B 2219/37087* (2013.01); *G05B 2219/49108* (2013.01)

(58) Field of Classification Search
CPC ............ B23Q 17/0971; B23Q 17/0952; G01N 19/08; G05B 2219/35354; G05B 2219/37087; G05B 2219/49108
USPC .......................................................... 702/56
See application file for complete search history.

(56) References Cited

U.S. PATENT DOCUMENTS

| 9,839,982 | B2 * | 12/2017 | Ando | B23Q 17/0961 |
| 2004/0179915 | A1 * | 9/2004 | Hill | G05B 19/406 |
| | | | | 409/141 |
| 2017/0074899 | A1 * | 3/2017 | Oouchi | G01P 15/0802 |
| 2017/0153208 | A1 * | 6/2017 | Kawai | G01M 1/30 |

FOREIGN PATENT DOCUMENTS

| JP | 6764516 B1 | 9/2020 |
| KR | 10-2009-0060512 A | 6/2009 |
| KR | 10-1134940 B1 | 4/2012 |
| KR | 10-2012-0069062 A | 6/2012 |

* cited by examiner

*Primary Examiner* — Aditya S Bhat
(74) *Attorney, Agent, or Firm* — Knobbe Martens Olson & Bear LLP

(57) ABSTRACT

An apparatus for detecting the status of a tool in a machine tool may include: a sensor unit configured to sense acceleration of a spindle of the machine tool in an x-axis direction and a y-axis direction during processing; and a processing device configured to convert the x-axis signal and the y-axis signal, sensed by the sensor unit, into signals capable of representing a cutting force by processing the x-axis and y-axis signals, detect a resultant force, and plot the detected resultant force on a polar coordinate system.

10 Claims, 16 Drawing Sheets ated on Nov. 24, 2020, which is hereby incorporated by reference for all purposes as if set forth herein.

APPARATUS FOR DETECTING STATUS OF TOOL IN MACHINE TOOL

CROSS-REFERENCE TO RELATED APPLICATION

This application claims priority from and the benefit of Korean Patent Application No. 10-2020-0158796, filed on Nov. 24, 2020, which is hereby incorporated by reference for all purposes as if set forth herein.

BACKGROUND

Field

The present disclosure relate to an apparatus for detecting the status of a tool in a machine tool.

Discussion of the Background

While a product is processed by a drill or tap having a small diameter among various tools which are generally used, the tools are often damaged. The tools are damaged due to various causes, for example, bubbles contained in the materials of the tools or vibrations of the tools.

When an operator continuously processes products with the damaged tools while the operator does not recognize that the tools are damaged, various problems such as a defective product may occur. That is, the damage of the tools in the machine tool cause a secondary loss, i.e. damage to a product, as well as a loss caused by the damage of the tools. Thus, a tool monitoring system is used to previously detect whether a tool has been damaged, thereby preventing a product defect which may occur afterwards.

The related art of the present disclosure is disclosed in Korean Patent No. 10-1134940 registered on Apr. 3, 2012 and entitled "Monitoring and Controlling Method for Condition of Machining System with Vibration Value of Spindle". The disclosure of this section is to provide background information relating to the present disclosure. Applicant does not admit that any information contained in this section constitutes prior art.

SUMMARY

An example tool monitoring system needs to process a product using a tool holder having a measurement sensor attached thereto or detects the cutting status of a high-speed spindle only with the magnitude of measured vibration. Thus, the tool monitoring system is vulnerable to disturbance and vibration as well as machine tool processing, which makes it difficult to check accurate statuses of the tools while the product is processed.

Furthermore, the tool monitoring system transmits/receives a signal measured by the tool holder through a wireless communication method. Thus, the reliability of the signal is low, and the system cost is relatively high.

Various embodiments of the present disclosure are directed to an apparatus for detecting the status of a tool in a machine tool, which includes two MEMS (Micro Electro-Mechanical Systems)-type vibration accelerometers attached to a non-rotational part of a spindle and configured to measure signals in a wired manner during processing, and analyze the measured signals to detect the status of a tool.

In an embodiment, an apparatus for detecting the status of a tool in a machine tool may include: a sensor unit configured to sense acceleration of a spindle of the machine tool in an x-axis direction and a y-axis direction during processing; and a processing device configured to convert the x-axis signal and the y-axis signal, sensed by the sensor unit, into signals capable of representing a cutting force by processing the x-axis and y-axis signals, detect a resultant force, and plot the detected resultant force on a polar coordinate system.

The sensor unit may include: a first acceleration sensor configured to sense the acceleration of the spindle in the x-axis direction; a first amplifier configured to amplify the signal sensed by the first acceleration sensor; a second acceleration sensor configured to sense the acceleration of the spindle in the y-axis direction; and a second amplifier configured to amplify the signal sensed by the second acceleration sensor, wherein the first and second acceleration sensors are each disposed at a preset angle.

The sensor unit may be installed on any one of the spindle of the machine tool, a header installed on the spindle, a tool and a turret.

The processing device may include: a signal processing unit configured to filter the signals sensed by the sensor unit and convert the filtered signals into digital signals, in order to prevent aliasing of the signals; a tool visualization unit configured to convert the signals, inputted from the signal processing unit, into signals capable of representing a cutting force based on a parameter set according to a processing condition, generate a norm value by adding up the converted x-axis and y-axis signals, and then create a graph into which the status of the tool and the number of blades during rotation are reflected, by plotting the norm value on a polar coordinate system; and an equipment control unit configured to detect the current status of the tool based on a polar plot of the tool visualization unit.

The signal processing unit may include: a first anti-aliasing filter configured to filter the x-axis signal in order to prevent aliasing of the x-axis signal; a first ADC (Analog Digital Converter) configured to convert a signal, outputted from the first anti-aliasing filter, into a digital signal; a second anti-aliasing filter configured to filter the y-axis signal in order to prevent aliasing of the y-axis signal; and a second ADC configured to convert a signal, outputted from the second anti-aliasing filter, into a digital signal.

The tool visualization unit may include: a first signal conversion filter configured to extract only a signal, which is generated when the blades of the tool come in contact with a material during a cutting process, from the x-axis signal according to the parameter; a first LPF (Low Pass Filter) configured to remove a pseudo-noise high-frequency signal from the signal filtered by the first signal conversion filter according to the parameter; a second signal conversion filter configured to extract only a signal, which is generated when the blades of the tool come in contact with the material during the cutting process, from the y-axis signal according to the parameter; a second LPF configured to remove a pseudo-noise high-frequency signal from the signal filtered by the second signal conversion filter according to the parameter; a vector calculation module configured to calculate a norm value, corresponding to a resultant force of the x-axis signal and the y-axis signal, by performing a norm operation on the signals filtered by the first LPF and the second LPF, respectively; and a tool visualization module configured to visualize a tool status by plotting the norm value, calculated by the vector calculation module, on a polar coordinate graph.

The tool visualization module may calculate the length of an array corresponding to one revolution of the tool from an array of successive norm values, and express the statuses of blades per one revolution of the tool by sequentially arranging norm values corresponding to the length of the array on the polar coordinate graph.

The equipment control unit may include: a communication module configured to transfer alarm information to a CNC (Computer Numerical Control) of the machine tool; an I/O (Input/Output) module configured to transfer a control signal to a PLC (Programmable Logic Controller) of the machine tool; and a tool status detection module configured to detect a tool status based on the polar plot outputted from the tool visualization unit, and transfer alarm information to the PLC of the machine tool through the communication module, or transfer a control signal to the CNC of the machine tool, according to the detection result.

The tool status detection module may set search regions by dividing 360 degrees of the polar coordinate system by the number of blades of the tool, calculate the major-axis lengths of ellipses representing the blades by calculating the maximum values in the respective search regions, and calculate the minor-axis lengths of the ellipses by calculating the median values in the respective search regions.

The tool status detection module may divide the tool status into normal, abased, chipped and completely damaged.

The tool status detection module may determine that the tool status corresponds to normal, when the major-axis lengths of the ellipses fall within a preset range and the ellipses have the same angle as an actual tool blade angle, determine that the tool status corresponds to abraded, when the major-axis length of an ellipse corresponding to an abraded blade is decreased and the major-axis length of an ellipse corresponding to the next blade following the abraded blade in a rotation direction is increased, determine that the tool status corresponds to chipped, when an ellipse corresponding to a chipped blade disappears or has a major-axis length equal to or less than a preset length, and determine that the tool status corresponds to completely damaged, when the ellipses are not expressed as the shape of a preset normal ellipse.

In accordance with the embodiment of the present disclosure, the apparatus for detecting the status of a tool in a machine tool includes two MEMS-type vibration accelerometers which are attached to a non-rotational part of a spindle and configured to measure a signal in a wired manner during processing, analyze the measured signal, and visualize the accurate status of a tool, in order to detect the status of the tool.

Furthermore, the apparatus for detecting the status of a tool in a machine tool in accordance with the embodiment of the present disclosure may output an alarm or perform control such as emergency stop according to a predetermined condition, based on the visualized tool status, thereby preventing a processing defect of a material.

DETAILED DESCRIPTION OF EMBODIMENTS

Figure 1:
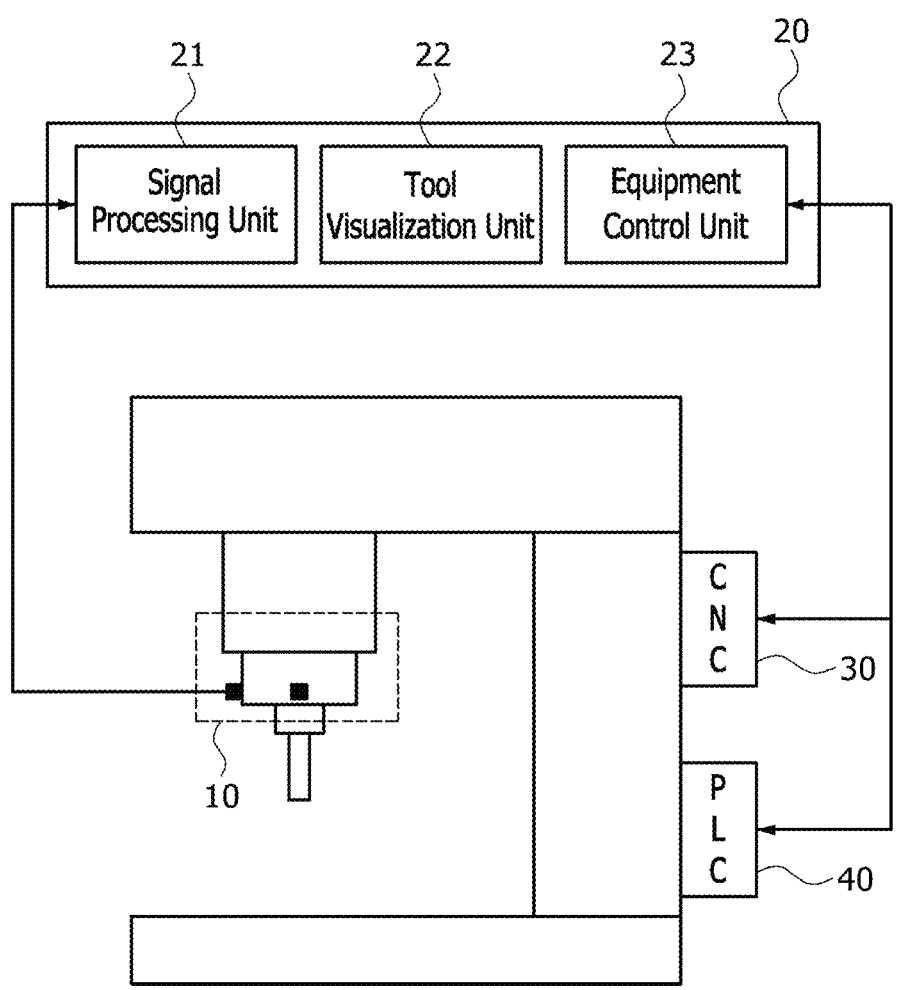
FIG. 1 is a configuration diagram illustrating an apparatus for detecting the status of a tool in a machine tool in accordance with an embodiment of the present disclosure.

As is traditional in the corresponding field, some example embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some example embodiments may be physically separated into two or more interacting and discrete blocks, units, and/or modules without departing from the scope of the inventive concept. Further, blocks, units, and/or module of some example embodiments may be physically combined into more complex blocks, units, and/or modules without departing from the scope of the inventive concept.

Hereinafter, an apparatus for detecting the status of a tool in a machine tool will be described below with reference to the accompanying drawings through various example embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
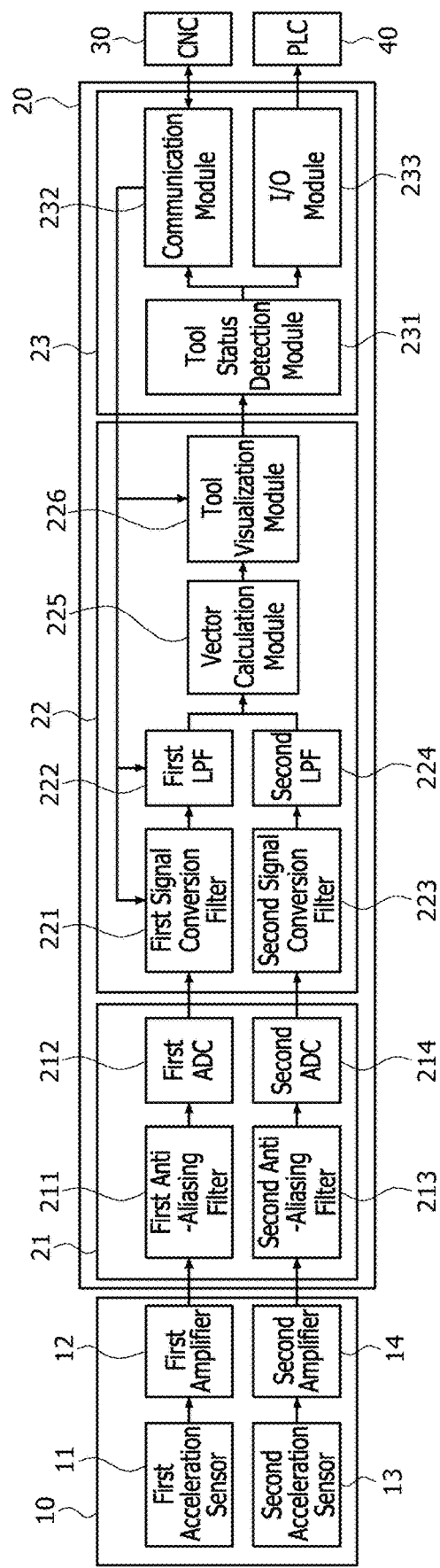
FIG. 2 is a block diagram illustrating the apparatus for detecting the status of a tool in a machine tool in accordance with the embodiment of the present disclosure.
Figure 3:
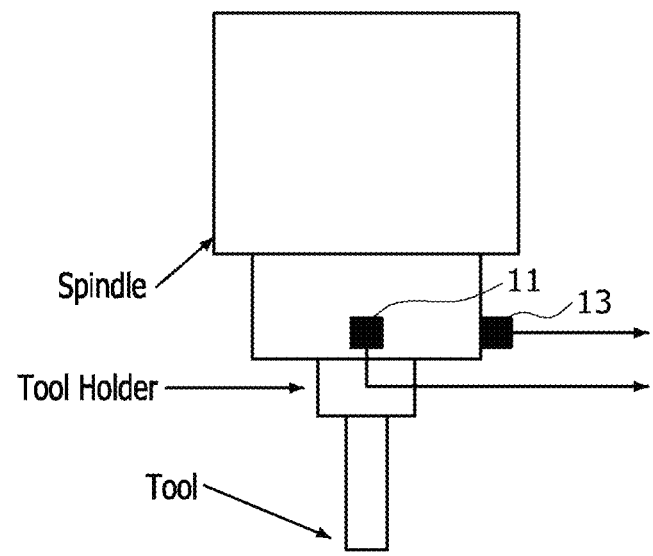
FIG. 3 is a diagram illustrating an attachment position of an acceleration sensor in accordance with the embodiment of the present disclosure.
Figure 4:
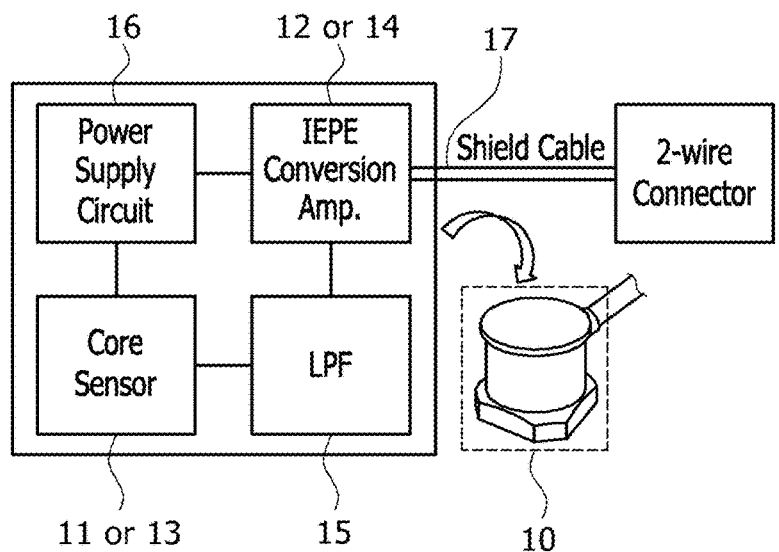
FIG. 4 is a diagram schematically illustrating a sensor unit and a signal flow in accordance with the embodiment of the present disclosure.
Figure 5:
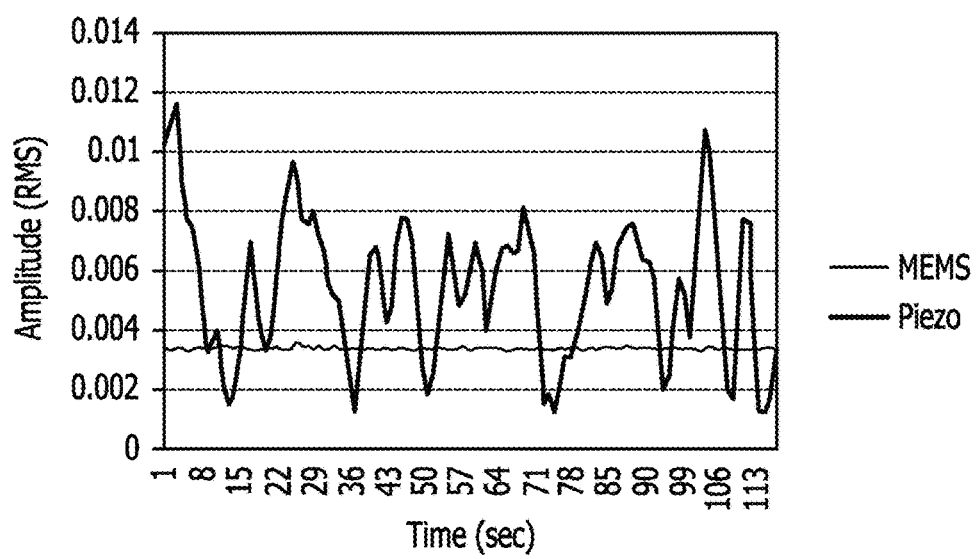
FIG. 5 is a graph illustrating signal stabilities of a piezo sensor and a MEMS (Micro Electro-Mechanical Systems) sensor.
Figure 6:
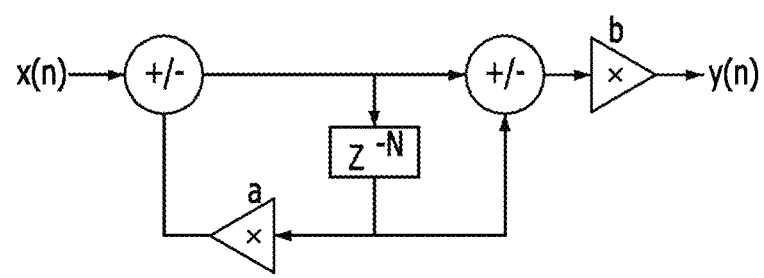
FIG. 6 is a diagram illustrating the structure of a signal conversion filter in accordance with the embodiment of the present disclosure.
Figure 7:
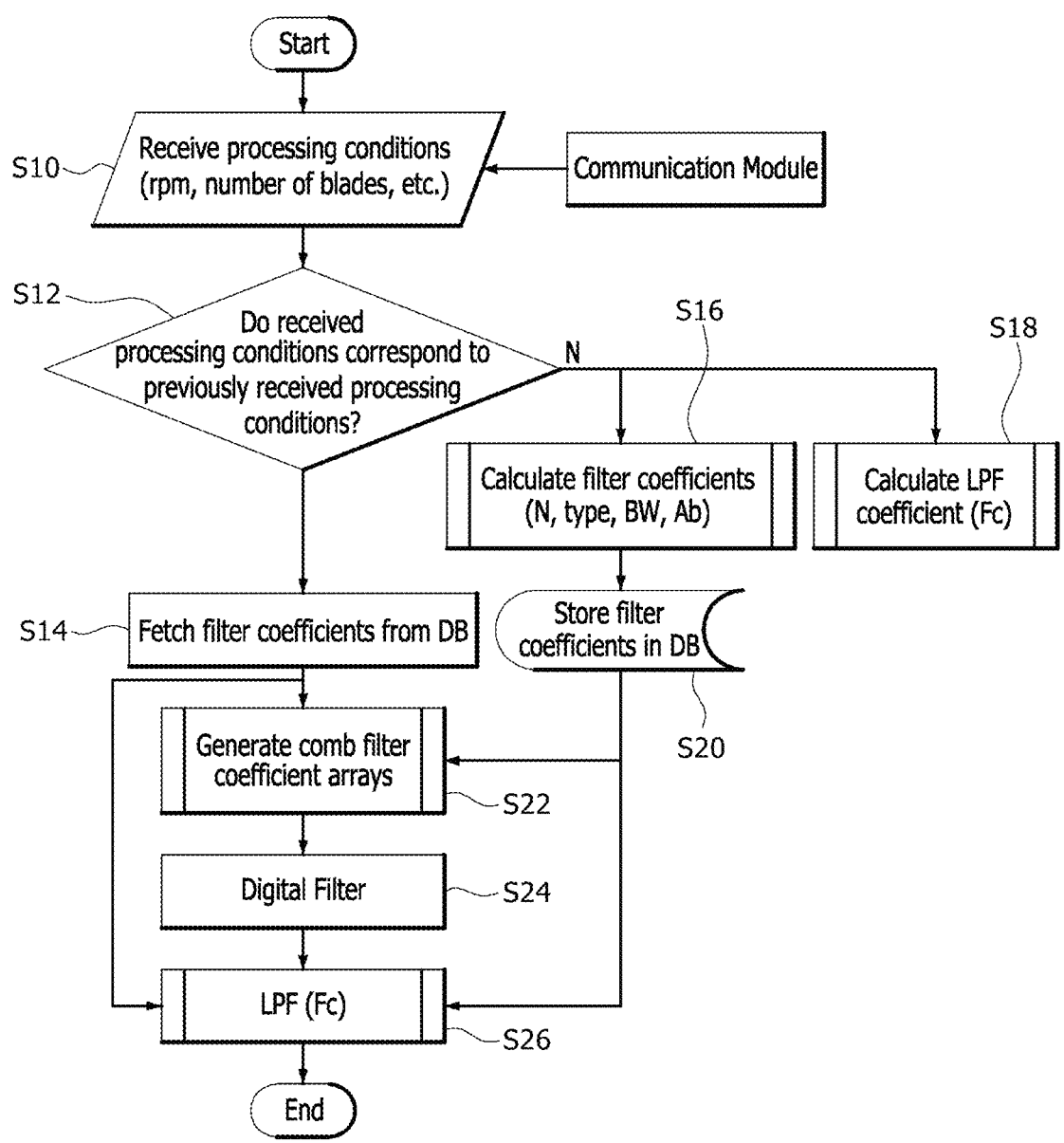
FIG. 7 is a flowchart illustrating operations of the signal conversion filter and an LPF (Low Pass Filter) in accordance with the embodiment of the present disclosure.
Figure 8:
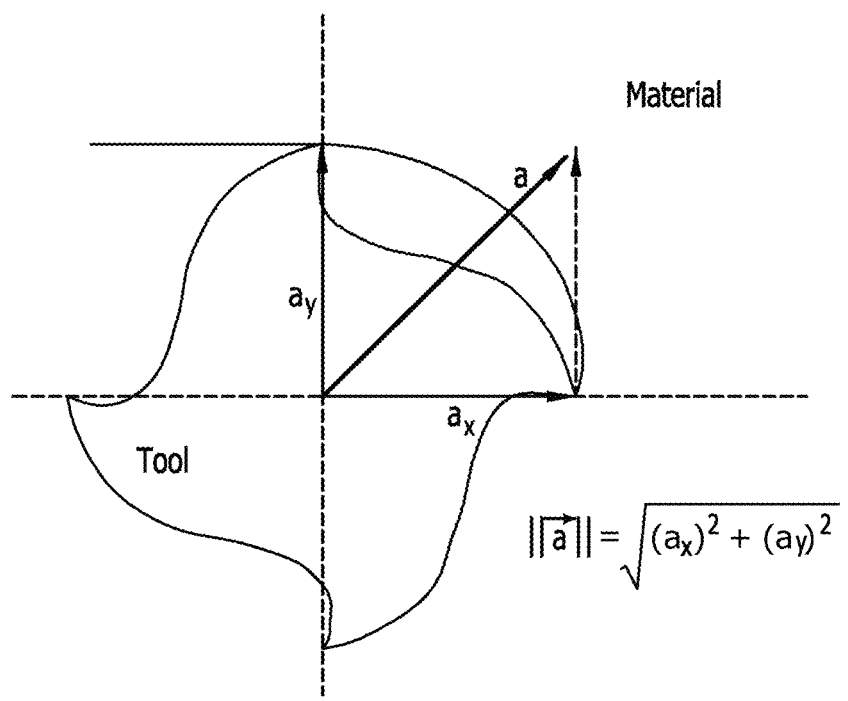
FIG. 8 is a diagram for describing a process of calculating a vector norm value during processing in accordance with the embodiment of the present disclosure.
Figure 9:
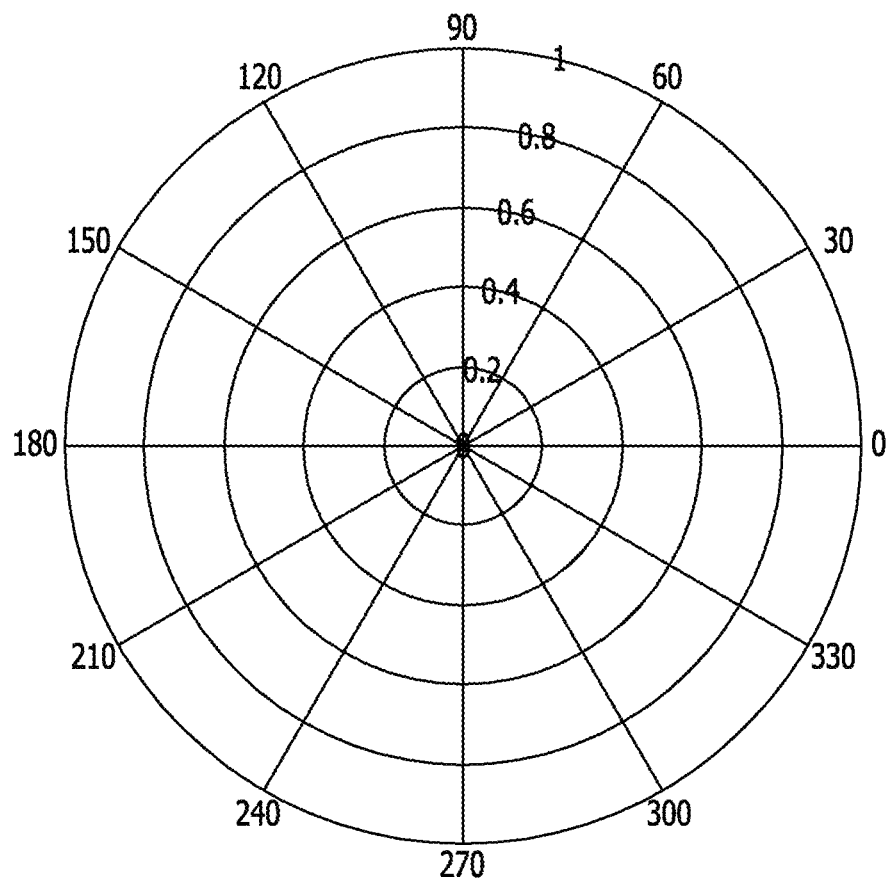
FIG. 9 is a diagram illustrating a polar plot in accordance with the embodiment of the present disclosure.
Figure 10A:
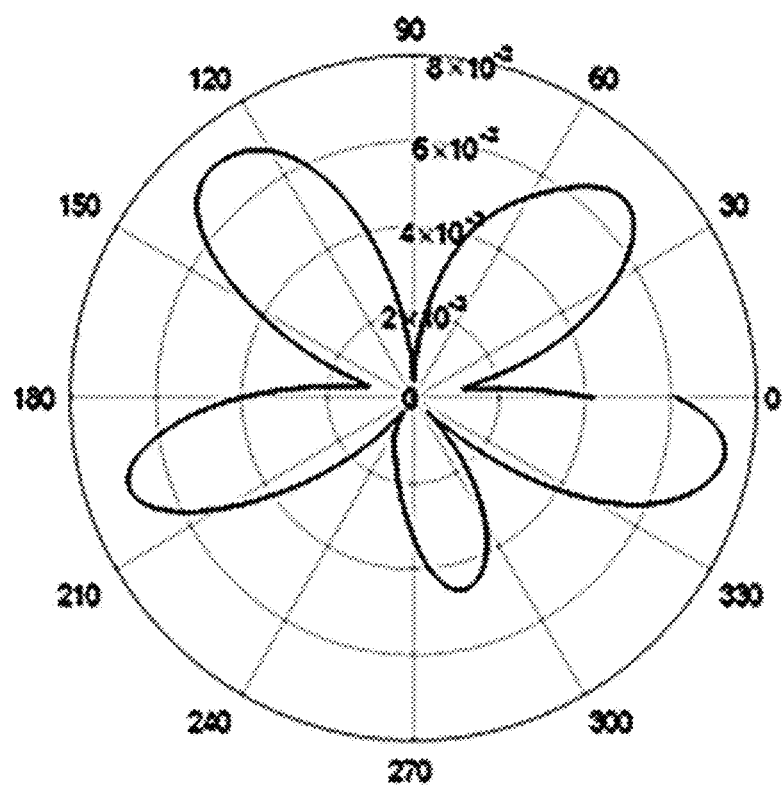
FIGS. 10A to 10D are diagrams illustrating results obtained by visualizing the statuses of a 5-blade tool in accordance with the embodiment of the present disclosure.
Figure 10B:
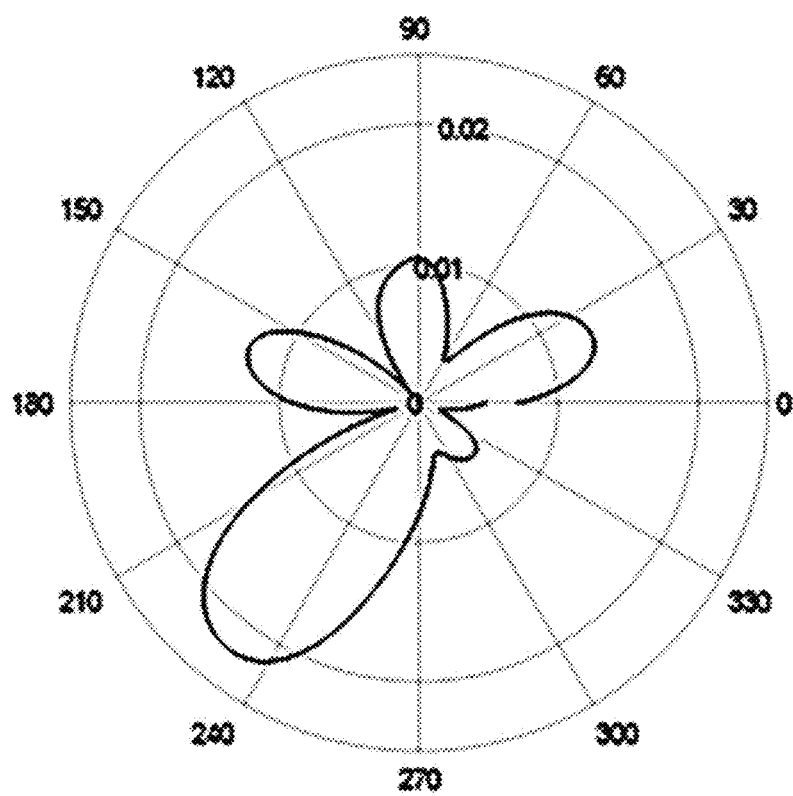
Figure 10C:
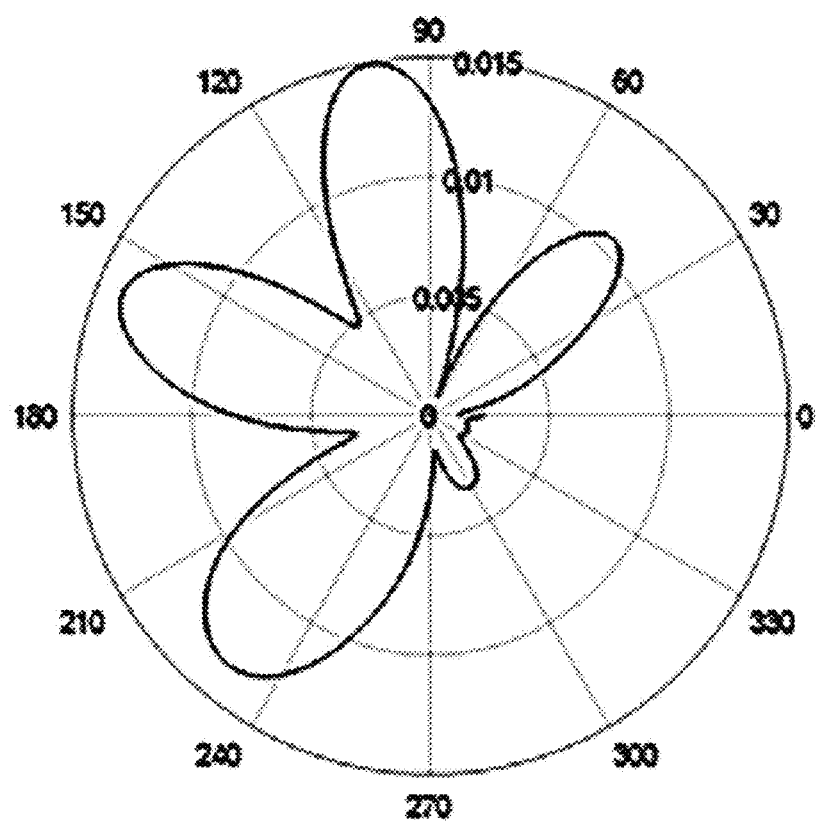
Figure 10D:
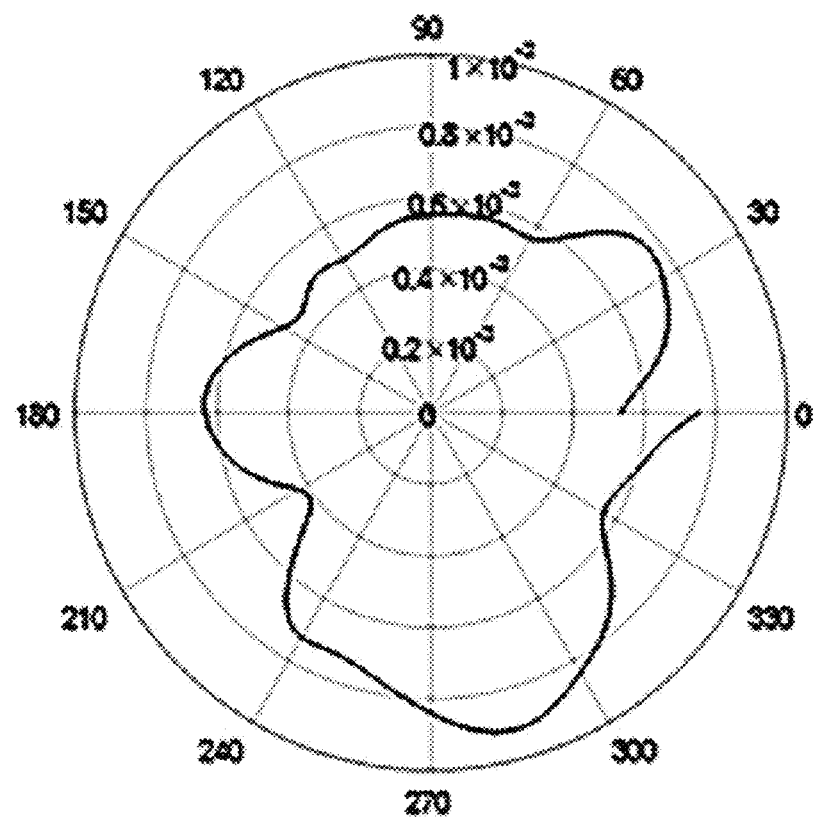
Figure 11:
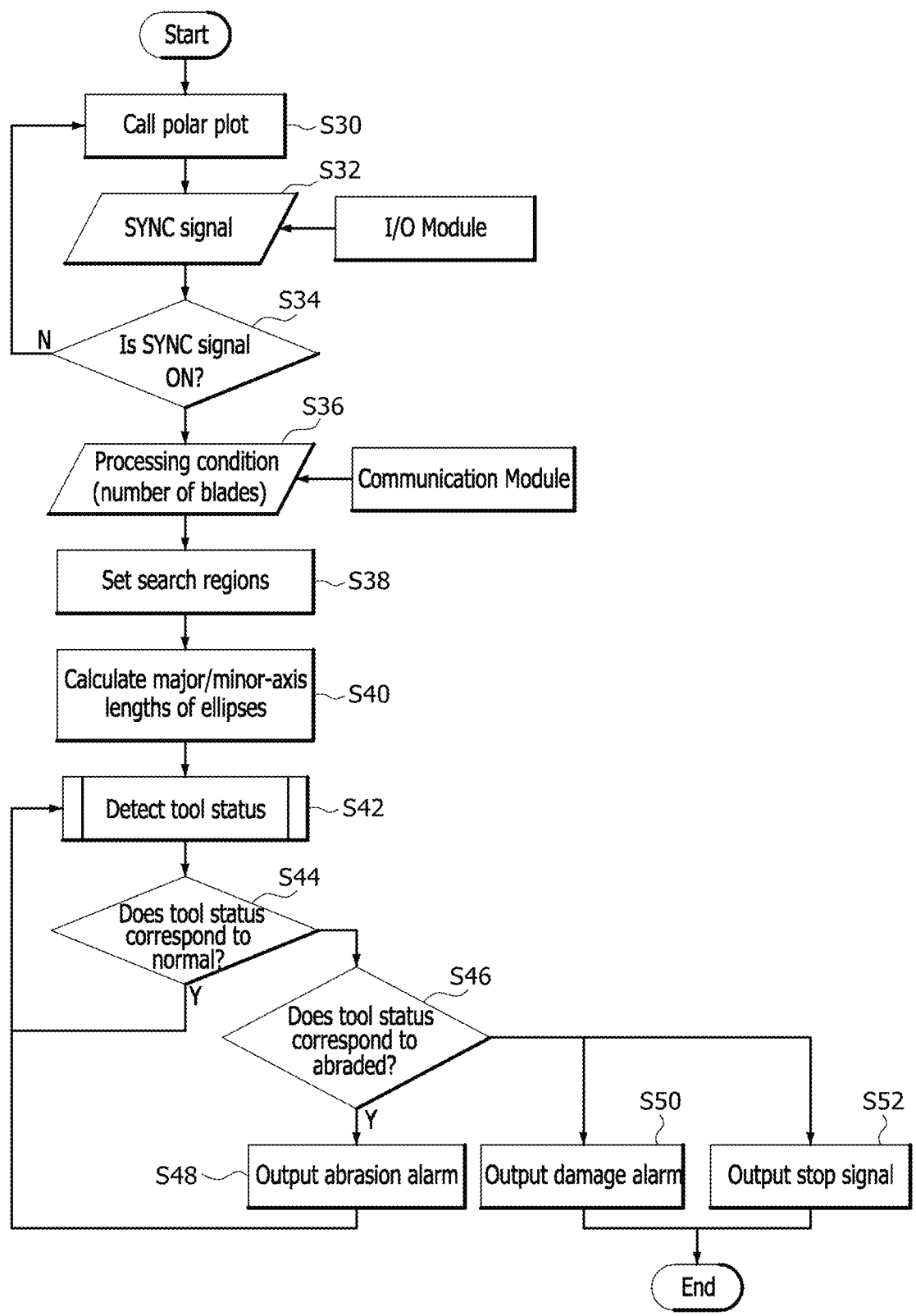
FIG. 11 is a flowchart illustrating an operation of an equipment control unit in accordance with the embodiment of the present disclosure.

FIG. 1 is a configuration diagram illustrating an apparatus for detecting the status of a tool in a machine tool in accordance with an embodiment of the present disclosure, FIG. 2 is a block diagram illustrating the apparatus for detecting the status of a tool in a machine tool in accordance with the embodiment of the present disclosure, FIG. 3 is a diagram illustrating an attachment position of an acceleration sensor in accordance with the embodiment of the present disclosure, FIG. 4 is a diagram schematically illustrating a sensor unit and a signal flow in accordance with the embodiment of the present disclosure, FIG. 5 is a graph illustrating signal stabilities of a piezo sensor and a MEMS (Micro Electro-Mechanical Systems) sensor, FIG. 6 is a diagram illustrating the structure of a signal conversion filter in accordance with the embodiment of the present disclosure, FIG. 7 is a flowchart illustrating operations of the signal conversion filter and an LPF (Low Pass Filter) in accordance with the embodiment of the present disclosure, FIG. 8 is a diagram for describing a process of calculating a vector norm value during processing in accordance with the embodiment of the present disclosure, FIG. 9 is a diagram illustrating a polar plot in accordance with the embodiment of the present disclosure, FIGS. 10A to 10D are diagrams illustrating results obtained by visualizing the statuses of a 5-blade tool in accordance with the embodiment of the present disclosure, and FIG. 11 is a flowchart illustrating an operation of an equipment control unit in accordance with the embodiment of the present disclosure.

Referring to FIGS. 1 to 11, the apparatus for detecting the status of a tool in a machine tool in accordance with the embodiment of the present disclosure includes a sensor unit 10 and a processing device 20. The processing device 20 includes a signal processing unit 21, a tool visualization unit 22 and an equipment control unit 23.

The sensor unit 10 senses vibration acceleration of a spindle of the machine tool in x-axis and y-axis directions during processing.

The sensor unit 10 includes a first acceleration sensor 11, a first amplifier 12, a second acceleration sensor 13 and a second amplifier 14.

The first acceleration sensor 11 is installed on the spindle of the machine tool or a header installed on the spindle, and senses the vibration acceleration of the spindle of the machine tool in the x-axis direction.

The second acceleration sensor 13 is installed on the spindle of the machine tool or the header installed on the spindle, and senses the vibration acceleration of the spindle of the machine tool in the y-axis direction.

As illustrated in FIG. 3, the first and second acceleration sensors 11 and 13 are disposed at a preset angle of 90 degrees, for example, based on the center of the spindle of the machine tool or the center point of the header.

The first amplifier 12 amplifies a signal sensed by the first acceleration sensor 11.

The second amplifier 14 amplifies a signal sensed by the second acceleration sensor 13.

Considering various structures and shapes of internal components in the machine tool, it may be necessary to reduce the sizes of the bodies of the sensors for the sake of smooth measurement of a signal generated during processing and convenience of an installation operation.

Referring to FIG. 4, each of the first and second acceleration sensors 11 and 13 may include a MEMS (Micro Electro-Mechanical Systems)-type core sensor installed in a case of the sensor unit 10.

A power supply circuit and an IEPE (Integrated Electronics Piezo-Electric) signal conversion amplifier circuit may be further embedded to drive a sensor having a predetermined output voltage range from 0V, and each connected to the first and second acceleration sensors 11 and 13.

Furthermore, since the IEPE conversion amplifier circuit is characterized in that power supply and signal output are performed at the same time, the sensor unit 10 may further include an LPF (Low Pass Filter) for reducing noise contained in a sensor output.

The outputs of the first and second acceleration sensors 11 and 13 may be inputted to the LFP. Since a signal having passed through the LPF is transferred to the IEPE conversion amplifier circuit, the first and second acceleration sensors 11 and 13 may be installed compatibly with a commercial IEPE sensor.

As the first and second amplifiers 12 and 14, the IEPE conversion amplifier may be employed. An output of the IEPE conversion amplifier is transferred to the processing device 20 through a shield cable 17. Therefore, the reliability of a sensed signal may be increased, and the manufacturing cost may be reduced.

The MEMS sensor basically serves as an accelerometer to measure acceleration. The MEMS sensor has a measurable frequency domain of 0 Hz to 10 kHz, and the magnitudes of signals at 0 Hz need to have a deviation range of ±1 mg (RMS).

The processing device 20 converts the x-axis and y-axis signals, sensed by the sensor unit 10, into signals capable of representing a cutting force by processing the x-axis and y-axis signals, detects a resultant force by adding up the converted signals, and then plots the detected resultant force on a polar coordinate system.

Referring to FIG. 2, the processing device 20 includes the signal processing unit 21, the tool visualization unit 22 and the equipment control unit 23.

The signal processing unit 21 filters the x-axis and y-axis signals, sensed by the sensor unit 10, and converts the filtered signals into digital signals, in order to prevent aliasing of the x-axis and y-axis signals.

The signal processing unit 21 includes a first anti-aliasing filter 211, a first ADC (Analog Digital Converter) 212, a second anti-aliasing filter 213 and a second ADC 214.

In order to successfully visualize a change in status of a tool, which occurs during a processing operation of the machine tool, it may be necessary to prevent aliasing of the signals inputted from the first and second acceleration sensors 11 and 13.

The first anti-aliasing filter 211 filters the x-axis signal in order to prevent aliasing of the x-axis signal. As the first anti-aliasing filter 211, a BPF (Band Pass Filter) or LPF may be employed depending on processing environments and conditions and the materials of the tools.

The first ADC 212 converts the signal, outputted from the first anti-aliasing filter 211, into a digital signal. The first ADC 212 needs to quantize the signal, outputted from the first anti-aliasing filter 211, at a resolution of 18 bit or more, and convert the quantized signal at a sampling speed of 10 kHz or more.

The second anti-aliasing filter 213 filters the y-axis signal in order to prevent aliasing of the y-axis signal. As the second anti-aliasing filter 213, a BPF or LPF may be employed depending on processing environments and conditions and the materials of the tools.

The second ADC 214 converts the signal, outputted from the second anti-aliasing filter 213, into a digital signal. The second ADC 214 needs to quantize the signal, outputted from the second anti-aliasing filter 213, at a resolution of 18 bit or more, and convert the quantized signal at a sampling speed of 10 kHz or more.

The tool visualization unit 22 converts the signals, inputted from the signal processing unit 21, into signals capable of representing a cutting force according to a parameter preset by a processing condition, generates a norm value by adding up the converted x-axis and y-axis signals, and then plots the generated norm value on the polar coordinate system, thereby creating a graph into which the status of a tool during rotation and the number of blades are reflected.

The tool visualization unit 22 includes a first signal conversion filter 221, a first LPF 222, a second signal conversion filter 223, a second LPF 224, a vector calculation module 225 and a tool visualization module 226.

Before the status of the tool is visualized, it may be necessary to extract, from the input sensor signals, only a signal which is generated when the blades of the tool come into contact with a material during a cutting process. This signal becomes an important factor capable of estimating a cutting force which is generated during processing, from a viewpoint of cutting mechanics.

During the cutting process, the material is repeatedly cut by the number of blades of the tool when the tool makes one revolution. During this process, vibration acceleration signals are periodically generated in the x-axis and y-axis directions. In an equation of F=ma, the cutting force F is proportional to the generated acceleration a, and the mass m is constant at all times because the mass is the total mass of the tool, the tool holder and the head of the spindle. Therefore, the non-linearity of the tool-holder-spindle vibration system may be ignored, and the acceleration in each axial direction may be measured to estimate the cutting force.

Since the present embodiment is aimed at visualizing a change in status of the tool, the present embodiment may achieve a desired purpose by using only relative values among the respective components, including the non-linearity of the tool-holder-spindle vibration system.

The first signal conversion filter 221 is a comb filter and has a structure illustrated in FIG. 6. The first signal conversion filter 221 may acquire a desired characteristic according to coefficients a and b and a sign.

The coefficients a and b may be calculated based on processing conditions received from a communication module which will be described below. Furthermore, according to the received processing conditions such as an RPM, the number of blades and the type of the tool, a filter order, a signal passing characteristic, and a cut-off frequency of the first LPF 222 may be calculated.

For improvement in efficiency of repeated processing, the coefficients calculated in such a manner may be stored in a DB (Data Base). When a processing condition is equal to a previously input processing condition, the coefficients stored in the DB may be used without the above-described coefficient calculation process.

The response of the first signal conversion filter 221 has N peaks or notches which are present at constant frequency intervals. Each of the peaks passes a signal, and each of the notches interrupts a signal. At this time, N becomes the order of the filter, and the number of calculated coefficients a and b of the first signal conversion filter 221 may correspond to the order N, and be expressed as a coefficient array.

This coefficient array is characterized in that only the first and last terms thereof have a value, the other terms are filled with 0, and the first term of the array of the coefficients a always has a value of 1. Therefore, in order to save memory resources required by the tool visualization unit 22, only the cutoff frequency of the first LPF 222 and the main coefficient values of the first signal conversion filter 221, i.e. the comb filter, are stored in the DB.

The cutoff frequency of the first LPF 222 may be calculated through an equation of $Fc(Hz)=(frpm \times Nfl)+10$. Here, frpm represents a tool rotation frequency, and Nfl represents the number of blades. The cutoff frequency of the first LPF 222 may be calculated through the number of blades and an RPM acquired from a communication module 232.

The coefficients of the first signal conversion filter 221, calculated in such a manner, are inputted to a digital filter with the sensor signals, and then subjected to filtering. In this case, a coefficient array having a normal number of coefficients corresponding to the order needs to be inputted to the digital filter. Therefore, a process of generating arrays of the coefficients a and b from the values stored in the DB is performed.

The normal arrays of coefficients a and b and the sensor signals are inputted to the digital filter to perform a filtering operation, and then passed through the first LPF 222 having a recalculated cutoff frequency Fc, in order to remove an unnecessary pseudo-noise high-frequency signal.

This series of processes are performed as illustrated in FIG. 7. The first signal conversion filter 221 receives processing conditions, for example, an RPM and the number of blades, from the communication module 232 in step S10, and determines whether the received processing conditions correspond to previously received processing conditions, in step S12.

When the received processing conditions correspond to the previously received processing conditions, the first signal conversion filter 221 fetches filter coefficients previously stored in the DB, in step S14. On the other hand, when the received processing conditions do not correspond to the previously received processing conditions, the first signal conversion filter 221 calculates filter coefficients in step S16, and the first LPF 222 calculates an LPF coefficient in step S18. At this time, the filter coefficients of the first signal conversion filter 221 and the LPF coefficient of the first LPF 222 may be stored in the DB in step S20.

Since a coefficient array having a normal number of coefficients corresponding to the order needs to be inputted to the digital filter, the first signal conversion filter 221 generates the coefficient arrays a and b from the values stored in the DB, in step S22, and the digital filter filters the coefficient arrays a and b and the x-axis signal in step S24.

The first LPF 222 removes a pseudo-noise high-frequency signal from the signal filtered by the digital filter, in step S26.

The second signal conversion filter 223 and the second LPF 224 are operated in the same manner as the first signal conversion filter 221 and the first LPF 222 except that the second signal conversion filter 223 and the second LPF 224 filter the y-axis signal. Thus, the detailed descriptions thereof will be omitted herein.

The vector calculation module 225 calculates a norm value corresponding to a resultant force of the x-axis signal and the y-axis signal by performing a norm operation on the x-axis signal filtered by the first LPF 222 and the y-axis signal filtered by the second LPF 224.

As illustrated in FIG. 8, each of the x-axis and y-axis signals may be considered as a vector component with a direction and magnitude. Since the sensors are disposed at an angle of 90 degrees so as to collect signals, the vector calculation module 225 may calculate a value corresponding to a resultant force of the two axes through the norm operation.

The tool visualization module 226 visualizes the status of the tool through a polar coordinate graph based on the normal value calculated by the vector calculation module 225.

Typically, estimated cutting forces calculated from the x-axis signal and the y-axis signal belong to one tool-holder-spindle vibration system, and thus include the same non-linear elements, and x-axis and y-axis relative values at the same cutting position and condition are uniformly expressed at all times. When a non-uniform cutting force is generated between the tool and the material, the corresponding status is immediately reflected into the signals. Therefore, status variation information which is generated while the material is cut by the tool may be found from an array of the calculated successive norm values.

According to such a principle, the tool visualization module 226 calculates the length Npl of an array corresponding to one revolution of the tool in the array of the successive norm values, and sequentially arranges norm value arrays corresponding to the length of the array on the polar coordinate graph, thereby expressing the statuses of the blades per one revolution of the tool. That is, the tool visualization module 226 visualizes the tool status using the polar coordinate graph illustrated in FIG. 9. At this time, the tool visualization module 226 calculates the length Npl of the array corresponding to one revolution of the tool in the successive norm arrays, based on an equation of Npl=fs/frpm using the RPM information among the processing conditions received from the communication module 232. Here, fs represents the sampling frequency of the ADC, and frpm represents the revolution frequency of the tool.

Then, the tool visualization module 226 may sequentially store the norm value arrays corresponding to the calculated length Npl in a temporary memory, and plot the normal value arrays on the polar coordinate graph, thereby expressing the statuses of the blades per one revolution of the tool.

The equipment control unit 23 may detect the current status of the tool based on the polar plot of the tool visualization unit 22, and transfer alarm information to a CNC (Computer Numerical Control) 30 of the machine tool or transfer a control signal to a PLC (Programmable Logic Controller) 40 of the machine tool, according to the detection result.

The equipment control unit 23 includes the communication module 232, an I/O (Input/Output) module 233 and a tool status detection module 231.

The communication module 232 transfers alarm information to the PLC 40 of the machine tool, and transfers the processing conditions to the tool visualization unit 22.

The I/O module 233 transfers a control signal, for example, a stop signal for the machine tool to the CNC 30 of the machine tool.

The tool status detection module 231 receives the polar plot which is finally outputted from the tool visualization unit 22, detects the current tool status, and generates an output signal according to the current tool status. The process of detecting the tool status from the received polar plot is performed as illustrated in FIG. 11.

The tool status detection is performed based on the shape of a graph displayed on a polar coordinate system, and the status of the tool is divided into normal, abraded, chipped and completely damaged.

The tool status having passed through the tool visualization unit 22 is characterized in that the shape of each blade is expressed as an elliptical closed curve, and the status of each blade is expressed as a change in ratio of the major axis to the minor axis of the corresponding ellipse.

The tool status detection module 231 sets search regions by dividing 360 degrees of the polar coordinate by the number of blades of the tool, received from the communication module 232, in order to detect the tool status. Then, the tool status detection module 231 calculates the maximum values in the respective search regions to calculate the major-axis lengths of ellipses representing the blades, and calculates the median values in the respective search regions to calculate the minor-axis lengths of the ellipses.

Referring to FIG. 10A illustrating the case in which the tool status corresponds to normal, the major-axis lengths of the respective ellipses are similar to each other, and the ellipses have the same angle as an actual tool blade angle.

Referring to FIG. 10B illustrating the case in which the tool status corresponds to abraded, the major-axis length of an ellipse corresponding to an abraded blade is reduced, and the major-axis length of an ellipse corresponding to the next blade following the abraded blade in the rotation direction is increased.

Referring to FIG. 10C illustrating the case in which the tool status corresponds to chipped, an ellipse corresponding to the chipped blade disappears or has a very short major axis.

Referring to FIG. 10D illustrating the case in which the tool status corresponds to completely damaged, normal ellipses are not expressed.

When the statuses other than the status of the normal tool are detected based on the detection result, the tool status detection module 231 provides alarm information to the CNC 30 of the machine tool through the communication module using Ethernet or another network. Furthermore, when rapid equipment control is required, the tool status detection module 231 transfers a signal to the PLC 40 of the machine tool through the I/O module 233, in order to perform immediate control such as transport stop or emergency stop for equipment.

Furthermore, the tool status detection module 231 may receive a digital signal (SYNC signal) from the PLC 40 of the machine tool through the I/O module 233, and perform tool status monitoring and tool visualization in a processing section desired by a user, in order to precisely match an actual processing point with a tool status monitoring point.

As such, the tool status detection module 231 calls the polar plot, which was finally outputted from the tool visualization unit 22, in step S30.

The tool status detection module 231 receives the digital signal (SYNC signal) from the I/O module 233 in step S32, and determines whether the digital signal (SYNC signal) is in an on-state, in step S34.

When the determination result of step S34 indicates that the digital signal (SYNC signal) is in an on-state, the tool status detection module 231 receives a processing condition (the number of blades) from the communication module in step S36, and sets search regions by dividing 360 degrees of the polar coordinate by the number of blades of the tool, in step S38.

As the search regions are set, the tool status detection module 231 calculates the major-axis lengths of ellipses representing the respective blades by calculating the maximum values in the respective search regions, and calculates the minor-axis lengths of the ellipses by calculating the median values in the respective search regions, in step S40.

At this time, the tool status detection module 231 detects the tool status based on the shape of a graph displayed on the polar coordinate system, and determines whether the tool status corresponds to normal, abased or damaged in steps S42, S44 and S46.

When the determination result indicates that the tool status corresponds to abraded, the tool status detection module 231 outputs alarm information to the PLC 40 of the machine tool in step S48. Furthermore, when the determination result indicates that the tool status corresponds to damaged, the tool status detection module 231 outputs a damage alarm to the PLC 40 of the machine tool in step S50, and outputs a stop signal for the machine tool to the CNC 30 in step S52.

Figure 12:
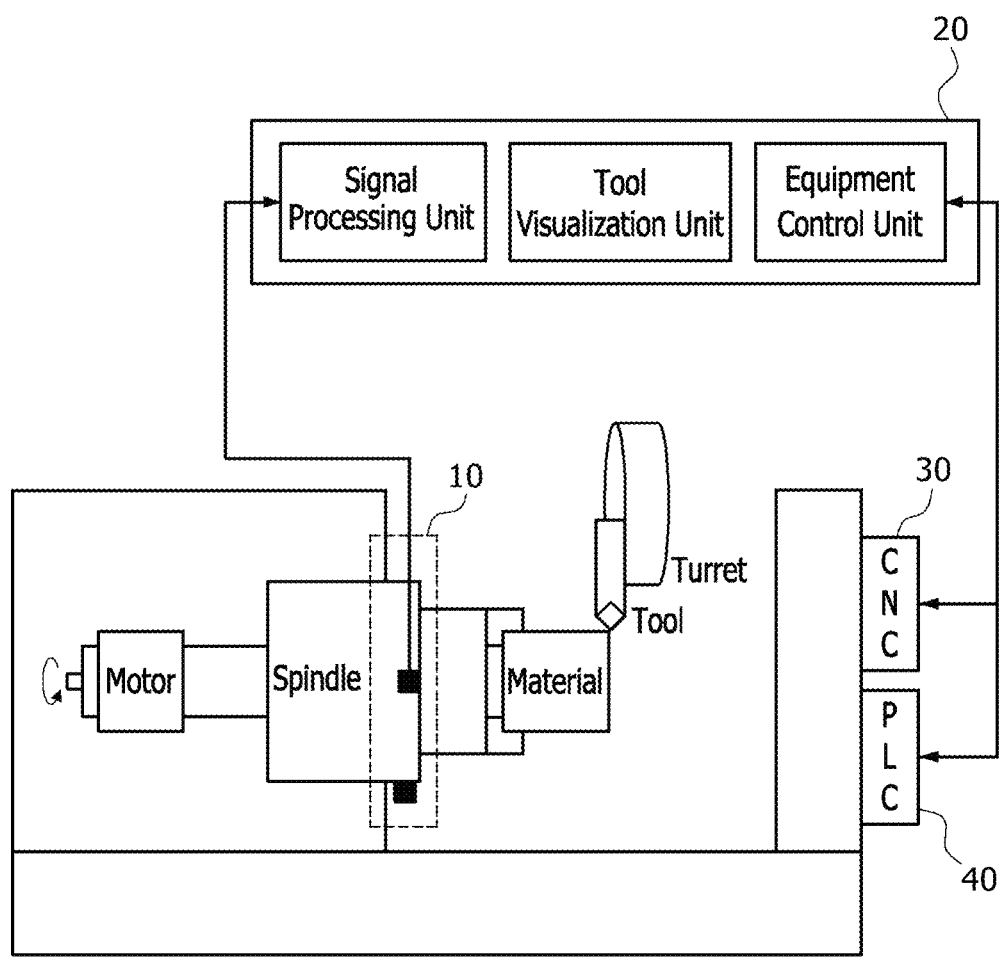
FIGS. 12 and 13 are diagrams illustrating examples in which the present embodiment is applied to lathes.
Figure 13:
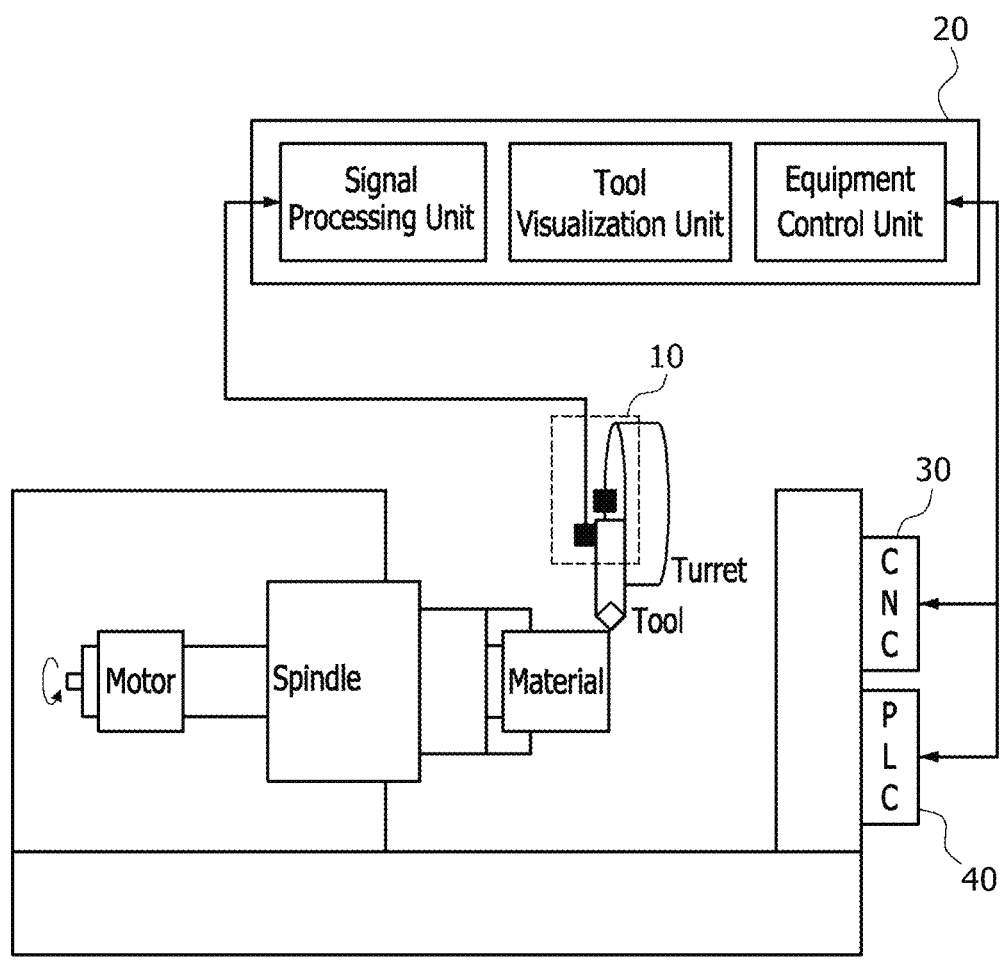

FIGS. 12 and 13 are diagrams illustrating examples in which the present embodiment is applied to lathes.

The sensor unit 10 may be installed on a spindle of a lathe as illustrated in FIG. 12, or installed on a tool or turret as illustrated in FIG. 13, while the first and second acceleration sensors 11 and 13 each maintain a preset angle.

Figure 14:
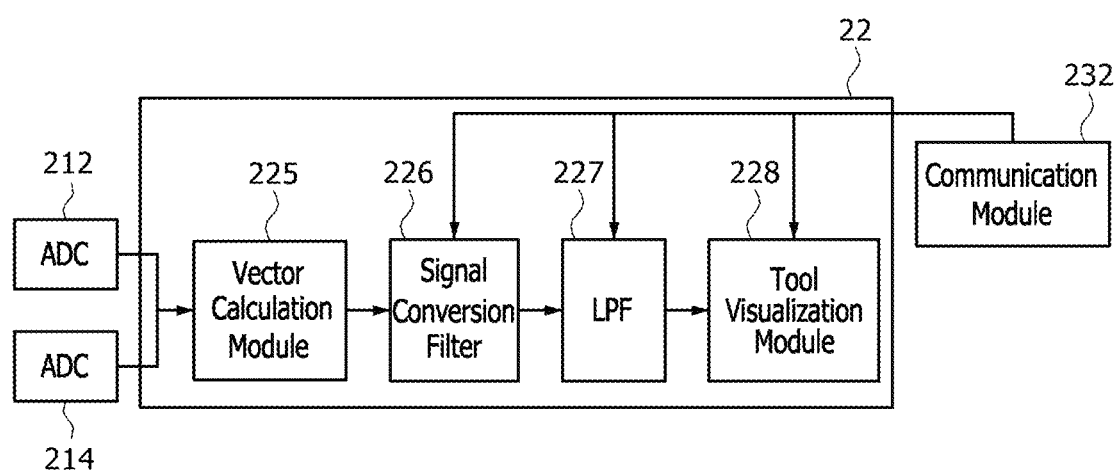
FIG. 14 is a diagram illustrating an example of another configuration of a tool visualization unit in accordance with the embodiment of the present disclosure.

FIG. 14 is a diagram illustrating an example of another configuration of the tool visualization unit in accordance with the embodiment of the present disclosure.

Referring to FIG. 14, the tool visualization unit 22 may have a configuration in which a signal conversion filter 226 and an LPF 227 are disposed at the rear of a vector calculation module 225, and thus reduce the total data amount. Such a configuration may reduce the manufacturing cost of the tool visualization unit 22, and increase the efficiency of the tool visualization unit 22.

The apparatus for detecting the status of a tool in a machine tool in accordance with the embodiment of the present disclosure includes two MEMS-type vibration accelerometers which are attached to a non-rotational part of a spindle and configured to measure a signal in a wired manner during processing, analyze the measured signal, and visualize the accurate status of a tool, in order to detect the status of the tool.

Furthermore, the apparatus for detecting the status of a tool in a machine tool in accordance with the embodiment of the present disclosure may output an alarm or perform control such as emergency stop according to a predetermined condition, based on the visualized tool status, thereby preventing a processing defect of a material.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Although example embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for detecting the status of a tool in a machine tool, comprising:

a sensor unit configured to sense acceleration of a spindle of the machine tool in an x-axis direction and a y-axis direction during processing, wherein the sensor unit comprises:
a first acceleration sensor configured to sense the acceleration of the spindle in the x-axis direction;
a first amplifier configured to amplify an x-axis signal sensed by the first acceleration sensor;
a second acceleration sensor configured to sense the acceleration of the spindle in the y-axis direction; and
a second amplifier configured to amplify a y-axis signal sensed by the second acceleration sensor,
wherein the first and second acceleration sensors are each disposed at a preset angle; and
a processing device configured to convert the x-axis signal and the y-axis signal, sensed by the sensor unit, into signals capable of representing a cutting force by processing the x-axis and y-axis signals, detect a resultant force, and plot the detected resultant force on a polar coordinate system.

2. The apparatus of claim 1, wherein the sensor unit is installed on any one of the spindle of the machine tool, a header installed on the spindle, a tool and a turret.

3. The apparatus of claim 1, wherein the processing device comprises:
a signal processing unit configured to filter the signals sensed by the sensor unit and convert the filtered signals into digital signals, in order to prevent aliasing of the signals;
a tool visualization unit configured to convert the signals, inputted from the signal processing unit, into signals capable of representing a cutting force based on a parameter set according to a processing condition, generate a norm value by adding up the converted x-axis and y-axis signals, and then create a graph into which the status of the tool and the number of blades during rotation are reflected, by plotting the norm value on a polar coordinate system; and
an equipment control unit configured to detect the current status of the tool based on a polar plot of the tool visualization unit.

4. The apparatus of claim 3, wherein the signal processing unit comprises:
a first anti-aliasing filter configured to filter the x-axis signal in order to prevent aliasing of the x-axis signal;
a first ADC (Analog Digital Converter) configured to convert a first signal, outputted from the first anti-aliasing filter, into a first digital signal;
a second anti-aliasing filter configured to filter the y-axis signal in order to prevent aliasing of the y-axis signal; and
a second ADC configured to convert a second signal, outputted from the second anti-aliasing filter, into a second digital signal.

5. The apparatus of claim 3, wherein the tool visualization unit comprises:
a first signal conversion filter configured to extract only a first signal, which is generated when the blades of the tool come in contact with a material during a cutting process, from the x-axis signal according to the parameter set;
a first LPF (Low Pass Filter) configured to remove a pseudo-noise high-frequency signal from the first signal filtered by the first signal conversion filter according to the parameter set;
a second signal conversion filter configured to extract only a second signal, which is generated when the blades of the tool come in contact with the material during the cutting process, from the y-axis signal according to the parameter set;

a second LPF configured to remove a pseudo-noise high-frequency signal from the second signal filtered by the second signal conversion filter according to the parameter set;

a vector calculation module configured to calculate a norm value, corresponding to a resultant force of the x-axis signal and the y-axis signal, by performing a norm operation on the signals filtered by the first LPF and the second LPF, respectively; and a tool visualization module configured to visualize a tool status by plotting the norm value, calculated by the vector calculation module, on a polar coordinate graph.

6. The apparatus of claim 5, wherein the tool visualization module calculates the length of an array corresponding to one revolution of the tool from an array of successive norm values, and expresses the statuses of blades per one revolution of the tool by sequentially arranging norm values corresponding to the length of the array on the polar coordinate graph.

7. The apparatus of claim 3, wherein the equipment control unit comprises:

a communication module configured to transfer alarm information to a CNC (Computer Numerical Control) of the machine tool;

an I/O (Input/Output) module configured to transfer a control signal to a PLC (Programmable Logic Controller) of the machine tool; and a tool status detection module configured to detect a tool status based on the polar plot outputted from the tool visualization unit, and transfer alarm information to the PLC of the machine tool through the communication module, or transfer a control signal to the CNC of the machine tool, according to the detection result.

8. The apparatus of claim 7, wherein the tool status detection module sets search regions by dividing 360 degrees of the polar coordinate system by the number of blades of the tool, calculates the major-axis lengths of ellipses representing the blades by calculating the maximum values in the respective search regions, and calculates the minor-axis lengths of the ellipses by calculating the median values in the respective search regions.

9. The apparatus of claim 8, wherein the tool status detection module divides the tool status into normal, abased, chipped and completely damaged.

10. The apparatus of claim 9, wherein the tool status detection module determines that the tool status corresponds to normal, when the major-axis lengths of the ellipses fall within a preset range and the ellipses have the same angle as an actual tool blade angle, determines that the tool status corresponds to abraded, when the major-axis length of an ellipse corresponding to an abraded blade is decreased and the major-axis length of an ellipse corresponding to the next blade following the abraded blade in a rotation direction is increased, determines that the tool status corresponds to chipped, when an ellipse corresponding to a chipped blade disappears or has a major-axis length equal to or less than a preset length, and determines that the tool status corresponds to completely damaged, when the ellipses are not expressed as the shape of a preset normal ellipse.

* * * * *